(12) United States Patent
Scott

(10) Patent No.: US 8,490,999 B2
(45) Date of Patent: Jul. 23, 2013

(54) TRAILER HITCH SYSTEM

(75) Inventor: Gary M. Scott, Milwaukie, OR (US)

(73) Assignee: Progress Mfg. Inc, Provo, UT (US)

( * ) Notice: Subject to any disclaimer, the term of this patent is extended or adjusted under 35 U.S.C. 154(b) by 546 days.

(21) Appl. No.: 11/827,379

(22) Filed: Jul. 10, 2007

(65) Prior Publication Data

US 2008/0073872 A1    Mar. 27, 2008

Related U.S. Application Data

(60) Provisional application No. 60/830,146, filed on Jul. 10, 2006.

(51) Int. Cl.
*B60D 1/06* (2006.01)

(52) U.S. Cl.
USPC ............................................................ 280/506

(58) Field of Classification Search
USPC ................................................. 280/506, 477
See application file for complete search history.

(56) References Cited

U.S. PATENT DOCUMENTS

| | | | |
|---|---|---|---|
| 2,062,788 A | 12/1936 | Jacob | |
| 2,671,673 A | 3/1954 | Benson | |
| 2,736,885 A | 2/1956 | Thompson | |
| 2,815,732 A | 12/1957 | Majors | |
| 3,015,162 A | 1/1962 | Bohnet | |
| 3,159,917 A | 12/1964 | Whitehead | |
| 3,161,422 A | 12/1964 | Wade | |
| 3,329,445 A | 7/1967 | Carson | |
| 3,818,599 A | 6/1974 | Tague | |
| 3,891,237 A | 6/1975 | Allen | |
| 3,912,302 A | 10/1975 | Patterson | |
| 3,938,122 A | 2/1976 | Mangus | |
| 4,017,977 A | 4/1977 | Light et al. | |
| 4,042,254 A | 8/1977 | Allen | |
| 4,050,714 A * | 9/1977 | Epp | 280/495 |
| 4,054,302 A | 10/1977 | Campbell | |
| 4,163,606 A | 8/1979 | Granno | |
| 4,192,426 A | 3/1980 | Gauthier | |
| 4,198,073 A | 4/1980 | Olsen | |
| 4,205,453 A | 6/1980 | Steele | |
| 4,215,875 A | 8/1980 | Younger | |
| 4,285,138 A | 8/1981 | Berry | |
| 4,312,516 A | 1/1982 | Olsen | |
| 4,560,183 A | 12/1985 | Cook | |
| 4,560,184 A | 12/1985 | Williams, Jr. | |
| 4,606,549 A * | 8/1986 | Williams, Jr. | 280/477 |
| 4,613,149 A | 9/1986 | Williams, Jr. | |
| 4,666,176 A | 5/1987 | Sand | |
| 4,666,177 A | 5/1987 | Vinchattle | |

(Continued)

*Primary Examiner* — Paul N Dickson
*Assistant Examiner* — Daniel Yeagley
(74) *Attorney, Agent, or Firm* — Clayton, Hawarth & Cannon, P.C.

(57) ABSTRACT

A trailer hitch system for improving the speed and safety of attaching the trailer to a tow vehicle. The hitch may include a shank that may be attached to the trailer through a ball hitch. A receiver may be provided on the tow vehicle such that attachment of the trailer to the tow vehicle may be accomplished by introducing the shank into the receiver when the tow vehicle is backed to the trailer. A funnel shaped guide member may be provided to facilitate aligning the shank with the receiver. Also, friction reducing rollers may be used with the shank or the receiver. Moreover, a height adjustment and visual guidance system may be included to facilitate connecting the trailer to the tow vehicle. The shank includes a stop in a fixed position for limiting the depth the shank extends within the receiver.

10 Claims, 11 Drawing Sheets

U.S. PATENT DOCUMENTS

| | | | |
|---|---|---|---|
| 4,687,220 A | 8/1987 | Danielson | |
| 4,722,542 A | 2/1988 | Hensley | |
| 4,723,788 A | 2/1988 | Suter | |
| 4,746,138 A | 5/1988 | James | |
| 4,759,564 A | 7/1988 | Williams, Jr. | |
| 4,802,686 A | 2/1989 | Isreal | |
| 4,807,899 A | 2/1989 | Belcher | |
| 4,844,496 A | 7/1989 | Webb et al. | |
| 4,844,497 A | 7/1989 | Allen | |
| 4,852,901 A | 8/1989 | Beasley et al. | |
| 4,856,200 A | 8/1989 | Riggs | |
| 4,905,376 A | 3/1990 | Neeley | |
| 4,925,287 A | 5/1990 | Lord et al. | |
| 4,938,495 A | 7/1990 | Beasley et al. | |
| 4,958,436 A | 9/1990 | Tusche | |
| 4,991,865 A | 2/1991 | Francisco | |
| 5,009,446 A | 4/1991 | Davis | |
| 5,035,441 A | 7/1991 | Murray | |
| 5,085,408 A | 2/1992 | Norton et al. | |
| 5,113,588 A | 5/1992 | Walston | |
| 5,115,572 A | 5/1992 | Harbison | |
| D327,867 S | 7/1992 | Elliott | |
| 5,188,385 A | 2/1993 | Wilson | |
| 5,235,468 A | 8/1993 | Stephens | |
| 5,236,215 A | 8/1993 | Wylie | |
| 5,269,554 A | 12/1993 | Law et al. | |
| 5,290,056 A | 3/1994 | Fath, IV | |
| 5,309,289 A | 5/1994 | Johnson | |
| 5,449,100 A * | 9/1995 | Eckhart | 224/509 |
| 5,478,101 A | 12/1995 | Roberson | |
| 5,482,310 A | 1/1996 | Staggs | |
| 5,547,116 A * | 8/1996 | Eckhart | 224/509 |
| 5,558,352 A | 9/1996 | Mills | |
| 5,676,292 A * | 10/1997 | Miller | 224/524 |
| 5,680,706 A | 10/1997 | Talcott | |
| 5,725,231 A | 3/1998 | Buie | |
| 5,769,443 A | 6/1998 | Muzny | |
| 5,791,676 A | 8/1998 | Jones | |
| 5,821,852 A | 10/1998 | Fairchild | |
| 5,861,814 A | 1/1999 | Clayton | |
| 5,882,029 A | 3/1999 | Kennedy | |
| 5,927,229 A | 7/1999 | Karr, Jr. | |
| 5,927,742 A | 7/1999 | Draper | |
| 5,941,551 A | 8/1999 | Harman et al. | |
| 5,951,035 A | 9/1999 | Phillips, Jr. et al. | |
| 5,970,619 A | 10/1999 | Wells | |
| 6,042,136 A | 3/2000 | Heinecke | |
| 6,076,847 A | 6/2000 | Thornton | |
| 6,100,795 A | 8/2000 | Otterbacher et al. | |
| 6,102,422 A | 8/2000 | Damron | |
| 6,139,041 A | 10/2000 | Murphy | |
| 6,168,181 B1 | 1/2001 | Gadd | |
| 6,170,852 B1 * | 1/2001 | Kimbrough | 280/479.2 |
| 6,178,650 B1 | 1/2001 | Thibodeaux | |
| 6,209,902 B1 | 4/2001 | Potts | |
| 6,213,608 B1 | 4/2001 | Osgood | |
| 6,239,926 B1 | 5/2001 | De Shazer | |
| 6,259,357 B1 | 7/2001 | Heider | |
| 6,273,448 B1 | 8/2001 | Cross | |
| 6,279,940 B1 | 8/2001 | Beavington | |
| 6,318,747 B1 | 11/2001 | Ratican | |
| 6,341,794 B1 | 1/2002 | Hunter | |
| 6,357,126 B1 | 3/2002 | Gillen, Jr. | |
| 6,386,572 B1 | 5/2002 | Cofer | |
| 6,446,999 B1 | 9/2002 | Davis, Jr. | |
| 6,454,290 B1 | 9/2002 | Turner | |
| 6,494,477 B1 | 12/2002 | Parker | |
| 6,517,098 B2 | 2/2003 | Grasso et al. | |
| 6,585,281 B1 | 7/2003 | Voorting | |
| 6,612,603 B2 | 9/2003 | Alger | |
| 6,679,512 B1 | 1/2004 | Plessala | |
| 6,698,783 B1 | 3/2004 | Zechbauer | |
| 6,827,363 B1 | 12/2004 | Amerson | |
| 6,851,697 B2 | 2/2005 | Kinnard | |
| 6,905,132 B2 | 6/2005 | Pierce | |
| 6,932,374 B1 | 8/2005 | Timms et al. | |
| 6,951,345 B2 | 10/2005 | Wilks | |
| 6,976,694 B1 | 12/2005 | Rayl et al. | |
| 6,990,745 B1 | 1/2006 | Schoenenberger | |
| 7,004,488 B2 | 2/2006 | Reiter et al. | |
| 7,025,371 B2 * | 4/2006 | Allen et al. | 280/491.5 |
| 7,036,840 B2 | 5/2006 | Kwilinski | |
| 7,077,417 B2 * | 7/2006 | Shoemaker | 280/506 |
| 2002/0060440 A1* | 5/2002 | Storer | 280/163 |
| 2002/0101055 A1 | 8/2002 | Warren | |
| 2003/0218313 A1 | 11/2003 | Beaudoin | |
| 2004/0227324 A1* | 11/2004 | Popham | 280/478.1 |
| 2005/0134020 A1 | 6/2005 | Wilks | |
| 2005/0218626 A1 | 10/2005 | Kwilinski | |
| 2006/0097480 A1 | 5/2006 | Hegefeld | |
| 2006/0186638 A1* | 8/2006 | Varner | 280/506 |

* cited by examiner

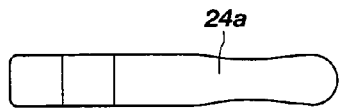
FIG. 10b
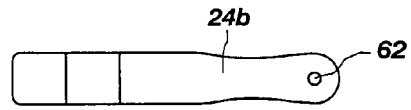
FIG. 11b
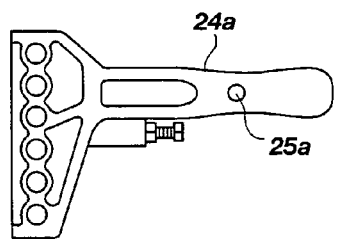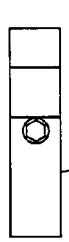
FIG. 10a  FIG. 10c
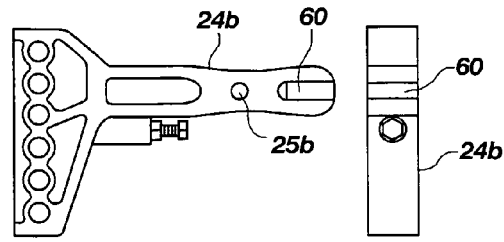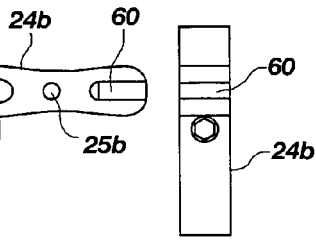
FIG. 11a  FIG. 11c
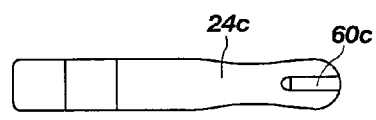
FIG. 12b
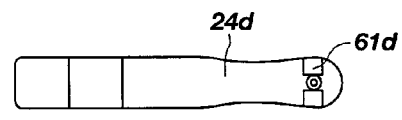
FIG. 13b
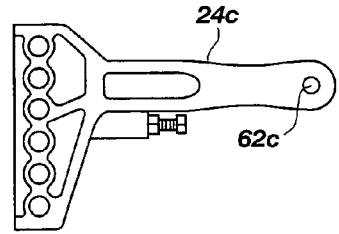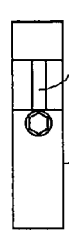
FIG. 12a  FIG. 12c
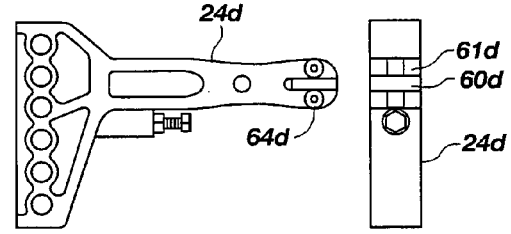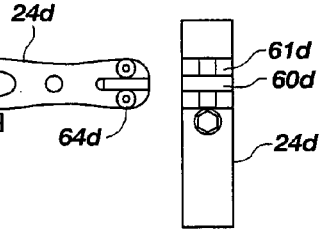
FIG. 13a  FIG. 13c
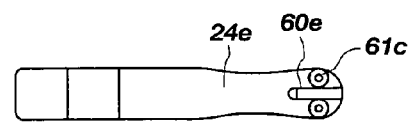
FIG. 14b
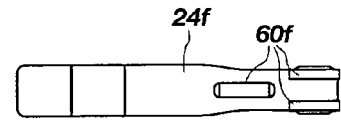
FIG. 15b
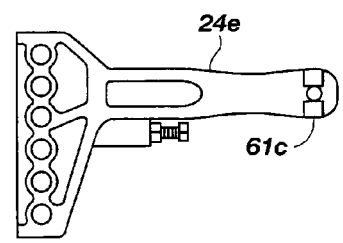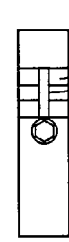
FIG. 14a  FIG. 14c
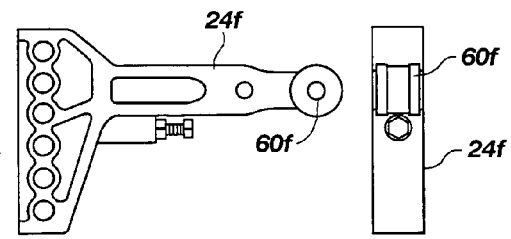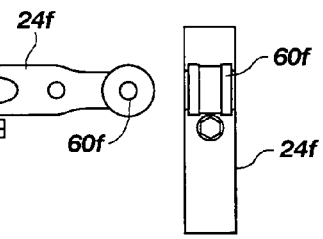
FIG. 15a  FIG. 15c

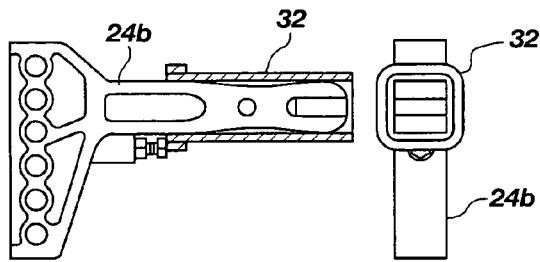
FIG. 22a   FIG. 22b
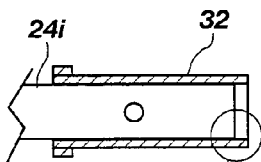 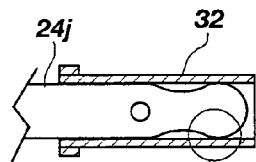 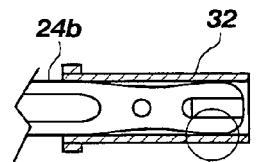
FIG. 23a   FIG. 24a   FIG. 25a
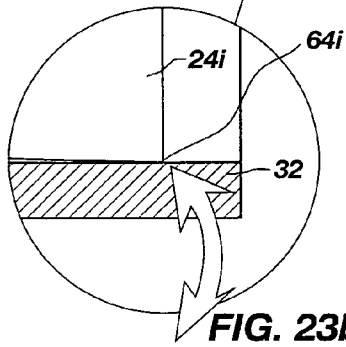 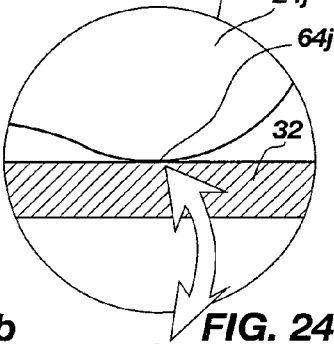 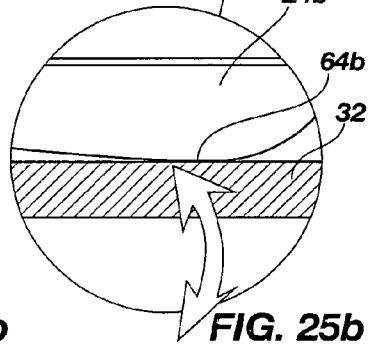
FIG. 23b   FIG. 24b   FIG. 25b
FIG. 23c   FIG. 24c   FIG. 25c
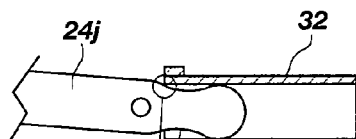 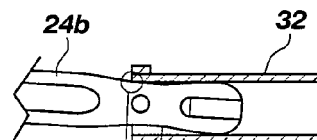
FIG. 26a   FIG. 27a
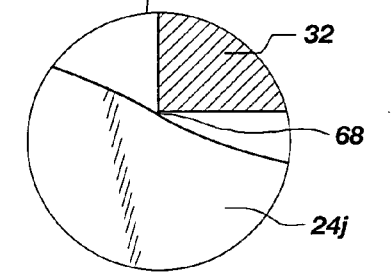 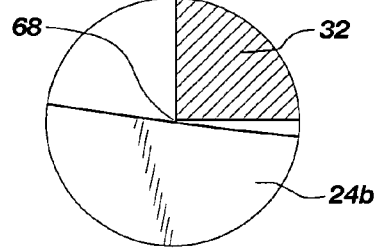
FIG. 26b   FIG. 27b

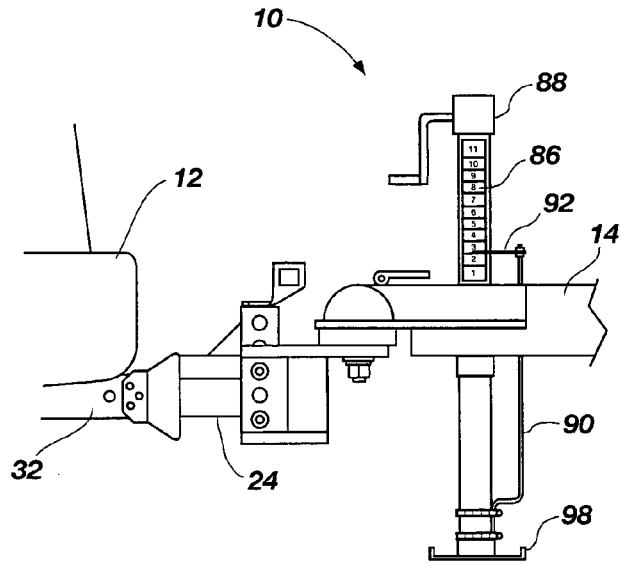
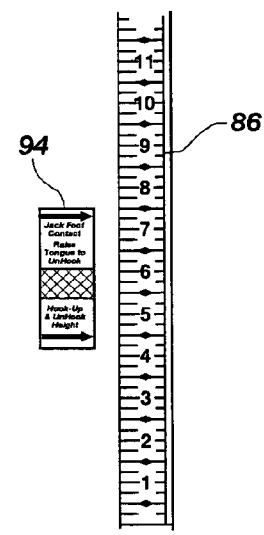
FIG. 36  FIG. 37
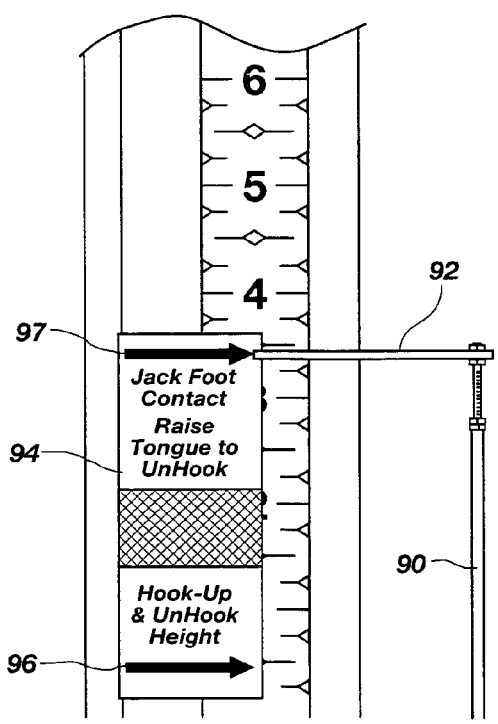
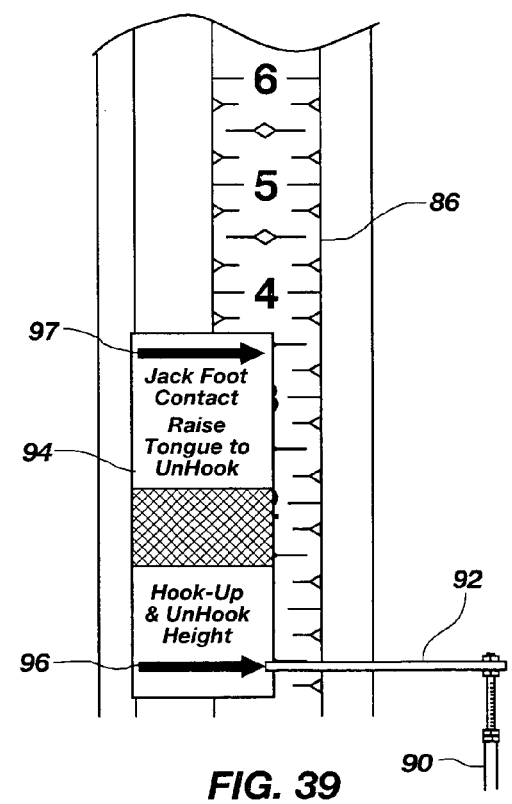
FIG. 38  FIG. 39

TRAILER HITCH SYSTEM

CROSS-REFERENCE TO RELATED APPLICATIONS

This application claims the benefit of U.S. Provisional Application No. 60/830,146, filed Jul. 10, 2006, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to trailer hitch systems, and more particularly, but not necessarily entirely, to trailer hitch systems that facilitate connecting trailers to tow vehicles.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, such as a ball clamp, positioned on a front of the trailer tongue, may engage the ball hitch in a loose friction fit, and may be secured to the ball in preparation for towing. Some hitches may also have load equalizing systems to distribute loads and allow the towing vehicle and trailer to remain level. Other mechanisms may also be used in association with a trailer hitch to reduce side sway of the trailer.

A common challenge with the known trailer hitch systems is attaching the trailer to the tow vehicle. Difficulty may arise in properly aligning the trailer with the tow vehicle as the tow vehicle is backed to engage with the trailer. Often during attempts to attach the trailer to the tow vehicle, the sharp rigid end of the trailer tongue may strike the back of the tow vehicle causing damage to the tow vehicle.

There have been many attempts to improve the method of connecting trailers to tow vehicles, yet the most common method remains the conventional ball connection, even though such method has several drawbacks. One of the drawbacks of the conventional ball mount system and method may include the necessity to precisely position the hitch ball that is connected to the vehicle under the trailer tongue ball clamp. On weight distribution hitches, the difficulty of attaching the trailer may be increased by the common necessity of installing and removing the heavy ball mount assembly, spring bars and anti-sway bars if so equipped, every time the trailer is connected or disconnected.

Other trailer hitch systems may include plug-in type hitches in which receivers are joined to the tow vehicle, and the hitch ball is joined to the trailer. A bar on the trailer tongue may be plugged into the receiver to attach the trailer to the tow vehicle. A drawback of the known plug-in hitches may include the requirement of a unique receiver hitch unit to be installed on the tow vehicle. Since vehicles used for towing are commonly equipped by the manufacturer with a receiver hitch already installed, removing and replacing the existing receiver hitch may be a significant impediment to the success of such towing systems. Other trailer hitch systems require unique mechanisms to be installed on the trailer. Yet other trailer hitch systems allow the plug-in receiver to be installed on the exterior of the manufacturer installed receiver, but such systems may add considerable cost, weight, and complexity to the trailer hitch.

Some of the known plug-in type trailer hitch systems are prone to binding during engagement or disengagement of the trailer with the tow vehicle. Such binding may be caused by different heights of the receiver with respect to the connecting bar on the trailer tongue, misalignment, improperly shaped engaging elements, and/or the lack of adequate bearing surfaces or rolling elements to reduce friction between the receiver and the connecting bar on the trailer tongue. Because of the considerable weight of both the tow vehicle and the trailer, even small misalignments can generate considerable frictional forces.

Various different mechanisms are known in the art for assisting in backing or aligning the tow vehicle with the trailer to facilitate attaching the trailer to the tow vehicle. Such mechanisms may be visual, optical, mechanical or electronic devices to assist in achieving the proper height, angle and position of the tow vehicle with respect to the trailer. Many of the devices are complex or bulky such that they may result in more of a hindrance than an aid.

Despite the advantages of known trailer hitch systems, improvements are still being sought. The prior art is characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 10a is a side view of one embodiment of a shank used with the hitch system of the present disclosure;

FIG. 10b is a top view of the shank of FIG. 10a;

FIG. 10c is an end view of the shank of FIG. 10a;

FIG. 11a is a side view of another embodiment of a shank used with the hitch system of the present disclosure;

FIG. 11b is a top view of the shank of FIG. 11a;

FIG. 11c is an end view of the shank of FIG. 11a;

FIG. 12a is a side view of an additional embodiment of a shank used with the hitch system of the present disclosure;

FIG. 12b is a top view of the shank of FIG. 12a;

FIG. 12c is an end view of the shank of FIG. 12a;

FIG. 13a is a side view of an additional embodiment of a shank used with the hitch system of the present disclosure;

FIG. 13b is a top view of the shank of FIG. 13a;

FIG. 13c is an end view of the shank of FIG. 13a;

FIG. 14a is a side view of an additional embodiment of a shank used with the hitch system of the present disclosure;

FIG. 14b is a top view of the shank of FIG. 14a;

FIG. 14c is an end view of the shank of FIG. 14a;

FIG. 15a is a side view of an additional embodiment of a shank used with the hitch system of the present disclosure;

FIG. 15b is a top view of the shank of FIG. 15a;

FIG. 15c is an end view of the shank of FIG. 15a;

FIG. 16b is a top view of the shank of FIG. 16a;

FIG. 16c is an end view of the shank of FIG. 16a;

FIG. 17b is a top view of the shank of FIG. 17a;

FIG. 17c is an end view of the shank of FIG. 17a;

FIG. 18b is a top view of the shank of FIG. 18a;

FIG. 18c is an end view of the shank of FIG. 18a;

FIG. 19b is a top view of the shank of FIG. 19a;

FIG. 19c is an end view of the shank of FIG. 19a;

FIG. 20b is an end view of the shank and receiver of FIG. 20a;

FIG. 21b is an end view of the shank and receiver of FIG. 21a;

FIG. 22a is a side view of the shank of FIG. 11a in a cross section of a receiver;

FIG. 22b is an end view of the shank and receiver of FIG. 22a;

FIG. 23a is an enlarged break-away view of the shank and receiver of FIG. 20a;

FIG. 23b is an enlarged view of a circled portion of FIG. 23a;

FIG. 23c depicts a contact area between the shank and receiver of FIG. 23b;

FIG. 24a is an enlarged break-away view of the shank and receiver of FIG. 21a;

FIG. 24b is an enlarged view of a circled portion of FIG. 24a;

FIG. 24c is a contact area between the shank and receiver of FIG. 24b;

FIG. 25a is an enlarged break-away view of the shank and receiver of FIG. 22a;

FIG. 25b is an enlarged view of a circled portion of FIG. 25a;

FIG. 25c is a contact area between the shank and receiver of FIG. 25b;

FIG. 26a is a break-away portion of the shank of FIG. 24a as it is being introduced into the receiver;

FIG. 26b is an enlarged view of a circled portion of FIG. 26a;

FIG. 27a is a break-away portion of the shank of FIG. 25a as it is being introduced into the receiver;

FIG. 27b is an enlarged view of a circled portion of FIG. 27a;

FIG. 28 is an enlarged break-away view of the shank and receiver of FIG. 24a;

FIG. 29 is an enlarged break-away view of the shank and receiver of FIG. 25a;

FIG. 31a is an end view of a receiver in accordance with the principles of the present disclosure;

FIG. 31b is a cross-sectional view of the receiver of FIG. 31a taken along line A-A in FIG. 31a;

FIG. 31c is a side view of the receiver of FIG. 31a partially broken away;

FIG. 32a is an end view of another embodiment of a receiver in accordance with the principles of the present disclosure;

FIG. 32b is a cross-sectional view of the receiver of FIG. 32a taken along line A-A in FIG. 32a;

FIG. 32c is a side view of the guide of FIGS. 32a and 32b;

FIG. 33a is an end view of another embodiment of a guide useful in accordance with the principles of the present disclosure;

FIG. 33b is a side cross-sectional view of the guide of FIG. 33a taken along line A-A in FIG. 33a;

FIG. 34a is an end view of another embodiment of a guide useful in accordance with the principles of the present disclosure;

FIG. 34b is a side cross-sectional view of the guide of FIG. 34a taken along line A-A in FIG. 34a;

FIG. 36 is a break-away side view of a trailer hitch system on a tow vehicle and trailer, the trailer hitch system including a height indicator system;

FIG. 37 is a break-away portion of a gauge for the height indicator system of FIG. 36;

FIG. 38 is an enlarged break-away view of the gauge of FIG. 37 with the trailer jack in a position for towing the trailer;

FIG. 39 is an enlarged break-away view of the gauge of FIG. 37 with the trailer jack in a position for attaching or detaching the trailer;

DETAILED DESCRIPTION

Figure 1:
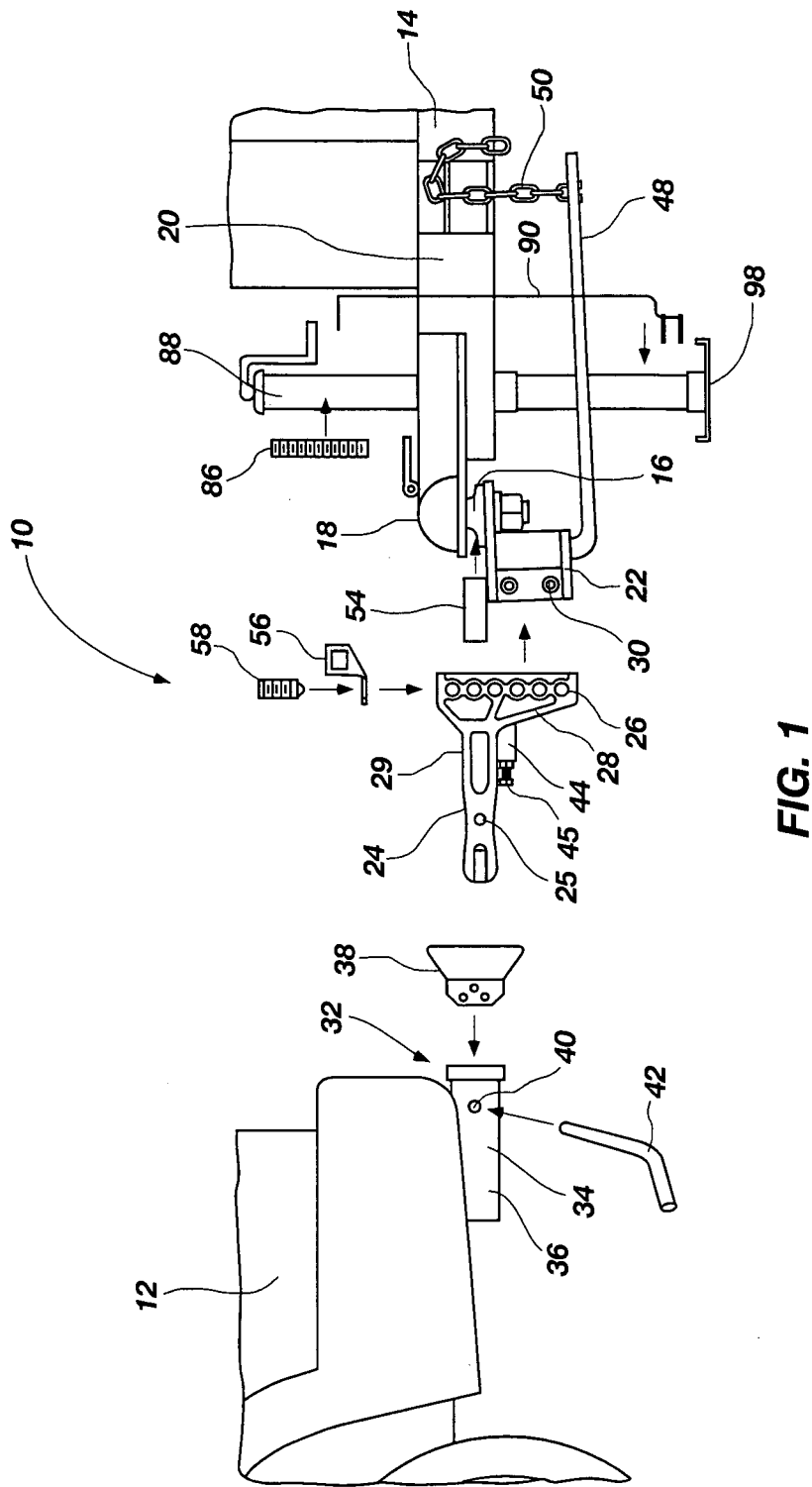
FIG. 1 is an exploded side view of a trailer hitch system on a break-away portion of a tow vehicle and a trailer in accordance with the principles of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present apparatus and methods for providing a trailer hitch system are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

As used herein, the term "elongate" shall be construed broadly to include structures that have one dimension, such as a length, that is greater than another dimension, such as a width or diameter.

Referring now to FIG. 1, an exploded side view of a trailer hitch system is shown indicated generally at 10 in accordance with the principles of the present disclosure. The trailer hitch system 10 is shown in FIG. 1 on a break-away portion of a towing vehicle 12 and a trailer 14. It will be understood that the towing vehicle 12 may be any variety of vehicle known in the art, such as a truck, tractor or car, or any other variety of on-road or off-road vehicle, for example. Likewise, the principles of the present disclosure may be utilized with any variety of trailer 14 known in the art, such as camping trailers, boat trailers or cargo trailers, for example.

The hitch system 10 may include a ball hitch 16 for attaching to a ball socket 18 on a tongue 20 of the trailer 14 in a manner known in the art. It will be understood that the hitch system 10 may be versatile, as explained more fully below, to allow the ball hitch 16 to remain attached to the socket 18 when the trailer 14 is detached from the towing vehicle 12. Alternatively, the hitch system 10 may be utilized such that the ball hitch 16 may remain on the towing vehicle 12 when the trailer 14 is detached from the towing vehicle 12, in a manner similar to customary trailer hitch systems.

The ball hitch 16 may be attached to a ball mount 22 in any suitable manner. For example, the ball hitch 16 may be formed with a stem that may be received in the ball mount 22 and a nut may be threaded on the stem to hold the ball hitch 16 on the ball mount 22. Accordingly, it will be understood that ball hitches 16 may be interchangeable, and ball hitches 16 of various different sizes and configurations compatible with the socket 18 may be used. It will be understood that the ball hitch 16 may be attached to the ball mount 22 in any other suitable manner known to those skilled in the art.

A shank 24 may be joined to the ball mount 22 for attaching the ball mount 22 to the towing vehicle 12. The shank 24 may include an upright portion 28 having a length extending in an up and down direction when the shank 24 is in use. The shank 24 may also include a lateral portion 29 that may form an elongate member extending in a direction transverse to the upright portion 28. The lateral portion 29 may define a central axis that may extend in a direction between the trailer 14 and the tow vehicle 12.

One embodiment of the shank 24 may be adjustably attachable to the ball mount through one or more shank openings 26. The openings 26 may be positioned in the upright portion 28 of the shank 24 such that the openings 26 may correspond to ball mount openings 30. It will be understood that the shank 24 may be adjusted in an upward position such that the shank openings 26 align with desired ball mount openings 30 to position the shank 24 at the desired height. Bolts, pins, clips or the like may be used to fasten the shank 24 to the ball mount 22.

The trailer hitch system 10 may also include a receiver 32 for attaching to the tow vehicle 12. The receiver 32 may include a receptacle 34 configured for receiving the lateral portion of the shank 24. The receptacle 34 may have a wall 36 forming a sleeve for receiving the shank 24. One embodiment of the receptacle 34 may be formed in a substantially square cross-sectional shape for receiving a correspondingly shaped portion of the shank 24. Accordingly, the receptacle 34 may be configured to circumscribe a portion of the shank 24. However, it will be understood that the receptacle 34 may have any other suitable shape, such as round, polygonal, rectangular, or oval, for example, corresponding to the shape of the shank 24 within the scope of the present disclosure. Moreover, other embodiments of the receptacle 34 may only partially circumscribe the shank 24. It will also be understood that one embodiment of the receiver 32 may be a conventional receiver that may be installed on the tow vehicle 12 at the manufacturer, or as an accessory. Accordingly, the term "receiver" as used herein shall be construed broadly to include various different types of structures for receiving or joining the shank 24 with a tow vehicle 12.

One embodiment of the receiver 32 may include a guide 38 that may be joined to the receptacle 34. The guide 38 may include a flared opening, such as a funnel shape, so as to facilitate introducing the shank 24 into the receiver 32. The guide 38 may have a cross-sectional shape corresponding to the shape of the receptacle 34 to avoid creation of edges for contacting the shank 24 as it is introduced into the receptacle 34. Also, the guide 38 may be removably joined to the receptacle 34, or the guide 38 may be permanently joined to the receptacle 34. It will also be understood that some embodiments of the receiver 32 may be formed without a guide 38, within the scope of the present disclosure.

One embodiment of the present disclosure may include a receiver opening 40 in the receiver 32 for receiving a hitch coupler 42 for attaching the shank 24 to the receiver 32. The hitch coupler 42 may be formed as a pin, bolt, clip, or any other suitable attaching mechanism known to those skilled in the art. The shank 24 may also include a hitch coupler opening 25 for receiving the hitch coupler 42 in or through the shank 24.

It will be understood that one embodiment of the hitch system 10 may be used with receivers 32 that may be installed on tow vehicles 12 by the manufacturer. Accordingly, it will be understood that one embodiment of the receivers 32 may not need to be modified or customized to be compatible with the hitch system 10. Thus, the principles of the present disclosure may be compatible with standardized equipment.

One embodiment of the shank 24 may include a stop 44. The stop 44 may be configured to contact the receiver 32 at a stop position for limiting a depth the shank 24 extends within the receiver 32. The stop 44 may be adjustable to a plurality of fixed positions with respect to the shank 24 for varying the depth the shank 24 extends within the receiver 32. For example, one embodiment of the stop 44 may include a threaded member, such as a bolt, that may be turned to adjust a length of the stop 44. The stop 44 may be adjusted such that when the stop 44 contacts the receiver 32, the receiver opening 40 aligns with the coupler opening 25 in the shank 24 for receiving the hitch coupler 42 to attach the shank 24 to the receiver 32. Accordingly, the stop 44 may facilitate aligning the receiver opening 40 with the coupler opening 25 to make connection of the hitch system 10 easier and quicker to accomplish.

One embodiment of the stop 44 may be disposed in a fixed position relative to the lateral portion 29 of the shank 24. The stop 44 may extend in a direction to the receiver 32 when the lateral portion 29 of the shank 24 extends toward the receiver 32. The stop 44 may be attached to and extend away from the upright portion 28 of the shank 24. Alternative embodiments of the stop 44 may not be fixed with respect to the shank 24. The stop 44 may terminate in a planar contacting face 45 for contacting the receiver 32. Other embodiments of the stop 44 may include a rounded contacting face. One implementation of the stop 44 may be an elongate member extending in a direction that may be substantially parallel with the lateral portion 29 of the shank 24.

It will be understood that other embodiments of the stop 44 may be adjustable using different mechanisms. For example, the stop may be formed as a rotatable cam disc having variable diameters. The disc may be attached to the shank 24 and rotated to adjust the radial dimension of the disc at the point of contact between the stop and the receiver 32. Alternatively, the stop may be formed of a telescoping device having ratchet members to allow the stop to be fixed at different lengths. Accordingly, it will be understood that any mechanism known in the art for forming an adjustable stop may be used within the scope of the present disclosure. Moreover, alternative embodiments of the stop may be fixed and not adjustable, or some embodiments of the present disclosure may be formed without a stop.

One embodiment of the hitch system 10 may include one or more spring bars 48, whereas other embodiments of the hitch system 10 may not include spring bars 48. It will be understood that in one embodiment of the present disclosure, two spring bars 48 may be used, one on each side of the trailer 14. The spring bars 48 may be joined to the ball mount 22 at one end, and to the trailer tongue 20 at an opposing end portion. One embodiment of the hitch system 10 may use chains 50 for joining the spring bars 48 with the trailer tongue 20. Alternatively, various different types of rigid brackets may be used to join the spring bars 48 to the trailer tongue 20. Moreover, it will be understood that any variety of lifting mechanisms or levers may be used to lift the spring bars 48 to a loaded position for attachment to the trailer tongue 20.

The spring bars 48 may be configured to provide an upward force on the ball mount 22 to equalize the distribution of the load and allow the towing vehicle 12 and trailer 14 to be more level. The spring bars 48 may also be beneficial for reducing sway of the trailer 14. It will be understood that the spring bars 48 may be formed in various different configurations in accordance with the principles of the present disclosure. For example, one embodiment of the spring bars 48 may be formed of elongate members having a rounded or rectangular cross-sectional shape. It will be understood that the spring bars 48 may have various different configurations. For example, the spring bars 48 may have a tapered configuration such that the cross sectional area of the spring bars 48 may reduce along a length of the bars from the ball mount 22 toward the end of the spring bars 48 that attach to the trailer tongue 20. Alternatively, the spring bars 48 may have a uniform, non-tapering configuration, or the spring bars 48 change in cross-sectional configuration along the length of the spring bars 48. Moreover, it will be appreciated that the spring bars may have various bends and other configurations within the scope of the present disclosure.

In one embodiment of the present disclosure, the spring bars 48 may be attached to the ball mount 22 through a pivotal connection to allow the spring bars 48 to swing or rotate with respect to the ball mount 22. The spring bars 48 may be removably or substantially fixedly attached to the ball mount 22.

One embodiment of the present disclosure may also include a stabilizer 54. The stabilizer 54 may be formed as a rubber ring that may fit between the trailer socket 18 and the hitch ball mount 22 to keep the shank 24 level for insertion into the receiver 32. It will be understood that the stabilizer 54 may be made of any suitable material in any suitable shape, and that some embodiments of the hitch system 10 may be formed without the stabilizer 54.

The hitch system 10 may also include a bracket 56 that may be attachable to the shank 24. One embodiment of the bracket 56 may utilize a fastener 58, such as a screw, bolt, clip, or the like for joining the bracket 56 to the shank 24. The bracket 56 may secure an alignment device, as discussed more fully below, and may also serve as a convenient hanger for items such as trailer security chains, safety brake leashes, or the like. It will also be understood that some embodiments of the hitch system may be formed without the bracket 56.

Figure 2:
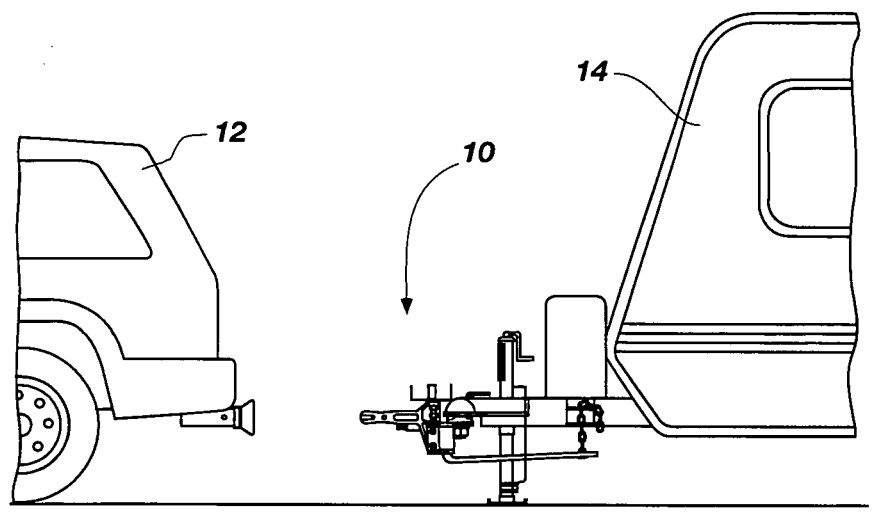
FIG. 2 is a break-away side view of a trailer hitch system attached to a trailer, and a tow vehicle separated from the trailer hitch.
Figure 3:
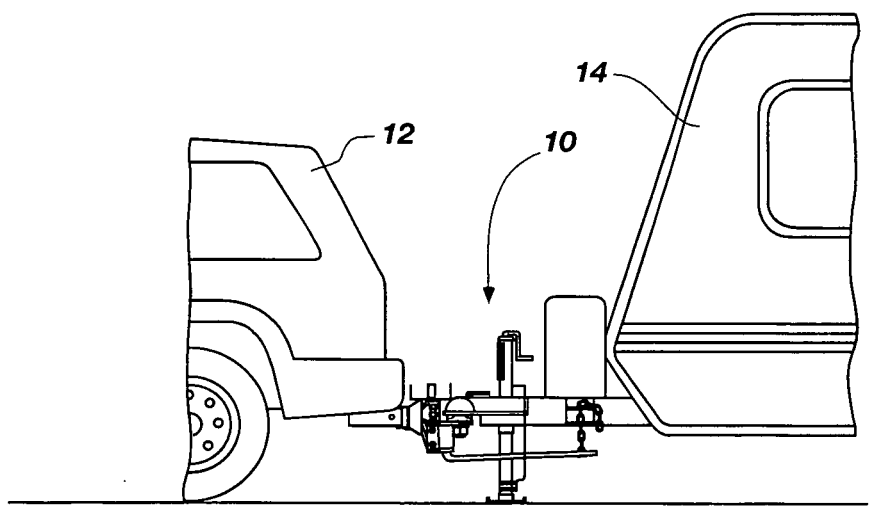
FIG. 3 is a break-away side view of a trailer hitch system attached to a trailer, and a tow vehicle attached to the trailer hitch.

Referring now to FIG. 2, it will be understood that the trailer hitch system 10 may be installed on the trailer 14 such that the ball hitch 16 may be received in the ball socket 18 and the spring bars 48 may be loaded even though the towing vehicle 12 may be detached from the trailer 14. The shank 24 may extend from the trailer 14 such that the towing vehicle 12 may be backed up such that the shank 24 may be received in the receiver 32 to attach the trailer 14 to the towing vehicle 12, as shown in FIG. 3. Accordingly, attachment of the trailer hitch system 10 primarily to the trailer 14 rather than the tow vehicle 12 may be accomplished differently than the customary manner of attaching a trailer hitch to the tow vehicle prior to attaching the hitch to the trailer.

Figure 4:
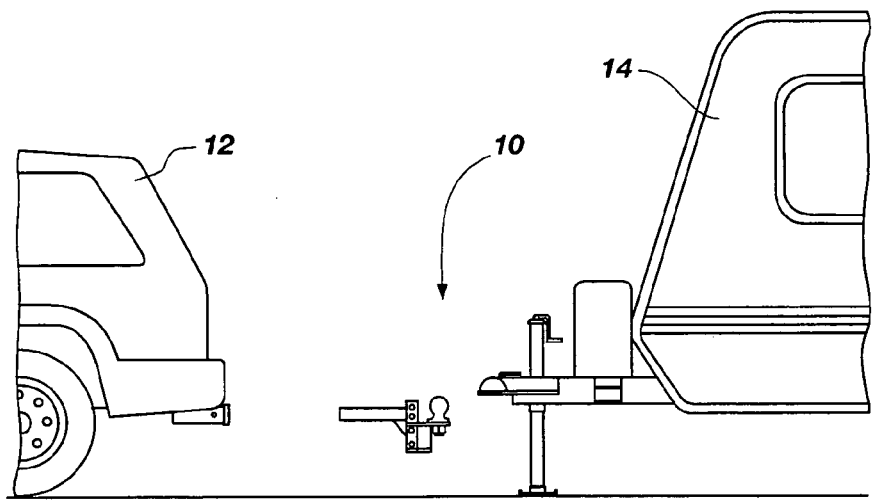
FIG. 4 is an exploded break-away side view of a trailer hitch system, a trailer, and a tow vehicle.
Figure 5:
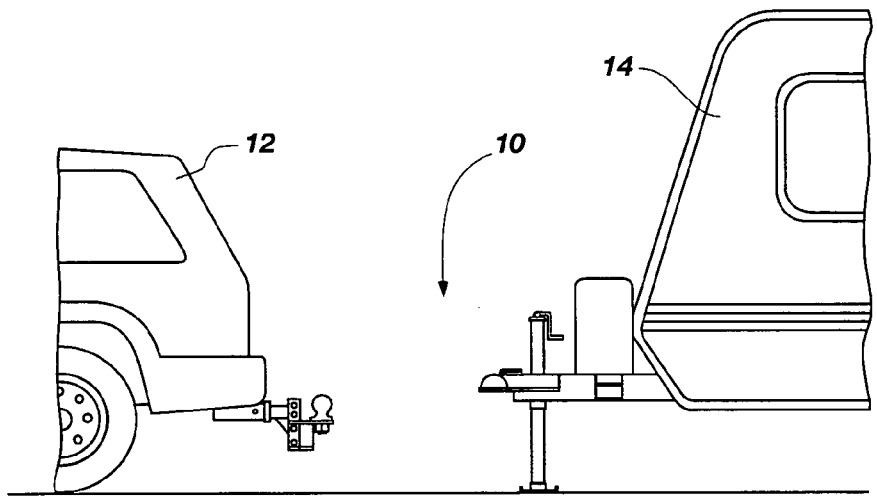
FIG. 5 is a break-away side view of the trailer hitch system, trailer and vehicle of FIG. 4, with the trailer hitch attached to the tow vehicle, with the trailer separated from the trailer hitch.
Figure 6:
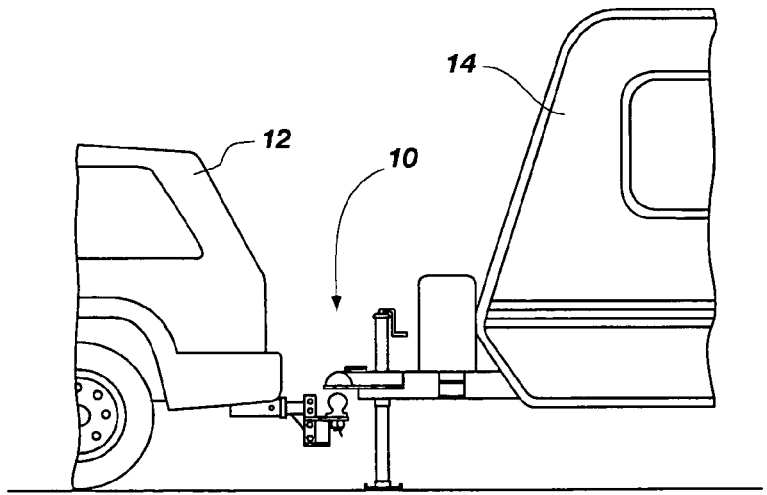
FIG. 6 is a break-away side view of the trailer hitch system, trailer and vehicle of FIG. 4, with the tow vehicle and trailer hitch positioned for attachment with the trailer.
Figure 7:
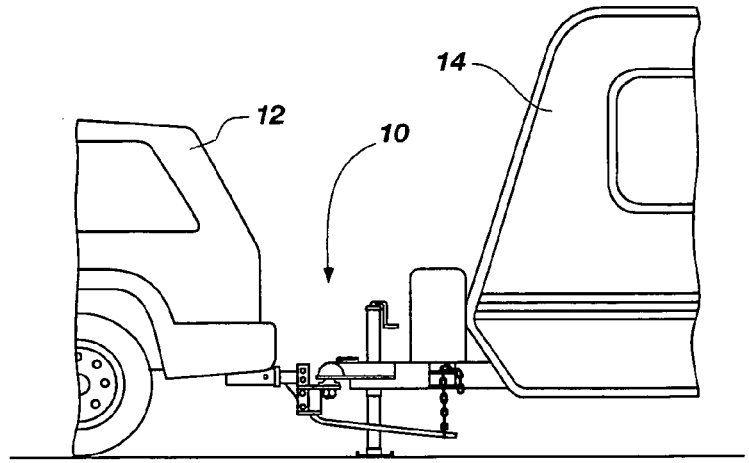
FIG. 7 is a break-away side view of the trailer hitch system, trailer and vehicle of FIG. 4, with the trailer attached to the trailer hitch and a spring bar in a relaxed position.
Figure 8:
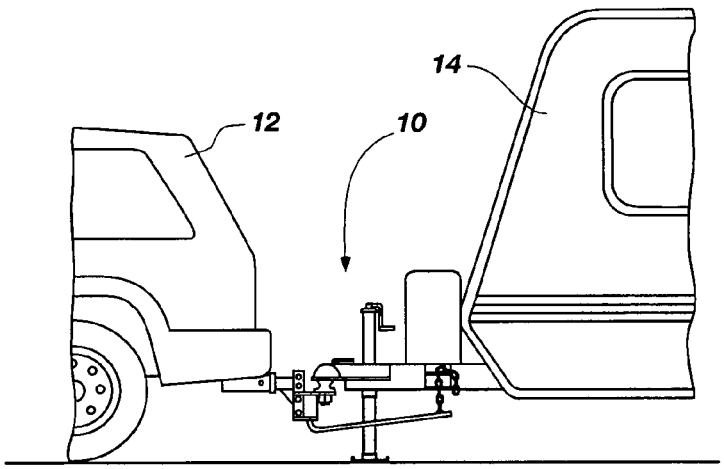
FIG. 8 is a break-away side view of the trailer hitch system, trailer and vehicle of FIG. 4, with the trailer attached to the trailer hitch and the spring bar in a loaded position.
Figure 9:
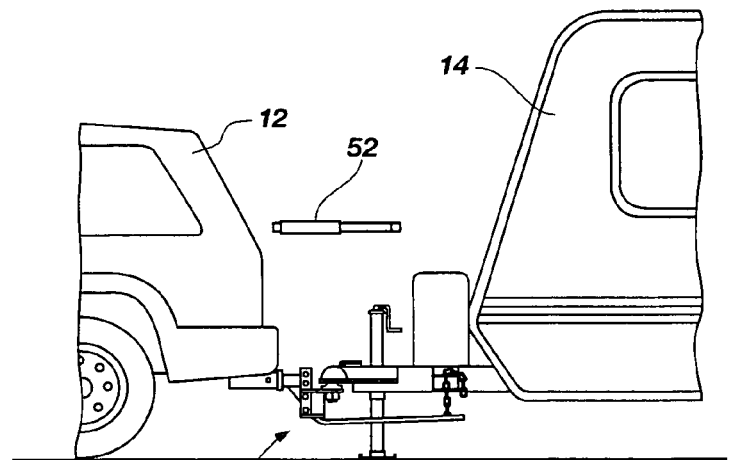
FIG. 9 is a break-away side view of the trailer hitch system, trailer and vehicle of FIG. 8, with a friction type anti-sway bar for being positioned on the hitch system.

It will be understood that the principles of the present disclosure allow for versatile use of the trailer hitch system 10. For example, FIGS. 4-9 depict alternative successive steps that may be used to attach the trailer 14 to the tow vehicle 12. As shown in FIG. 4, which shows the trailer hitch 10 detached from both the tow vehicle 12 and the trailer 14, the tow hitch system 10 may also be attached to the tow vehicle 12 prior to attaching to the trailer 14, as shown in FIG. 5. The tow vehicle 12 may then be backed to the trailer with the hitch 10 on the tow vehicle as shown in FIG. 6. The trailer 14 may then be lowered such that the ball hitch 16 may be received in the ball socket 18 as shown in FIG. 7. As shown in FIG. 8, the spring bar 48 may be lifted to be tensioned or loaded to equalize the load on the hitch 10. Also, as shown in FIG. 9, an anti-sway bar 52, such as a friction-type anti sway bar, or any other anti-sway mechanism or accessory may be attached to the hitch system 10. It will also be understood that ancillary connections to the trailer 14 including electrical connections, safety chains and emergency brake leashes, may also be connected.

Referring now to FIGS. 10a-19c, it will be understood that the shank 24 may be formed in various different configurations within the scope of the present disclosure. For example, FIG. 10a shows a side view of one embodiment of a shank 24a in accordance with the principles of the present disclosure. A top view of the shank 24a is shown in FIG. 10b, and an end view of the shank 24a is shown in FIG. 10c. It will be understood that FIGS. 11a-19c are arranged with similar views of alternative embodiment shanks, as indicated by reference numerals 24b-24j. It will be appreciated that when referring to the shank in general herein without regard to a specific embodiment, reference numeral 24 may be used.

The shank 24a may be formed without any moving parts or friction reduction members, such as rollers. However, the shank 24a may be formed with rounded or smooth corners to facilitate insertion of the shank 24a into the receiver 32.

As shown in FIGS. 11a-11c, another embodiment of the shank 24b may be formed with a roller 60. The roller 60 may be formed as a wheel configured to rotate about a central axis 62. The axis 62 may be formed as a pin, bolt, projection, or the like, for defining an axis of rotation of the roller 60. As an edge of the roller 60 contacts the receiver 32, the roller may be allowed to rotate to thereby reduce friction between the shank 24b and the receiver 32. Such reduction of friction may facilitate connecting the shank 24b to the receiver 32, as well as reduce wear on both the shank 24b and the receiver 32. It will be understood that the roller 60 may be formed in any other suitable configuration for reducing friction within the scope of the present disclosure.

It will be understood that the roller 60 may be positioned on the shank 24b so that the axis 62 may be upright to allow the roller to reside in a substantially horizontal or lateral extending plane when in use. Alternatively, it will be understood that a roller 60c may be provided on a shank 24c such that the roller 60c extends in a substantially vertical or upright plane, as shown in FIGS. 12a-12c. The roller 60c may thus have an axis 62c that extends in a lateral direction.

As shown in FIGS. 13a-13c, another embodiment of the shank 24d may be provided, in which a lateral roller 60d may be provided, and one or more smaller upright rollers 61d may also be provided in combination with the roller 60d. It will be understood that the smaller rollers 61d may be sized and positioned so as to avoid interfering with the roller 60d, and to provide frictionless contact points at desired positions on the shank 24d. For example, smaller rollers 61d may be positioned both above and beneath the roller 60d on both sides of the shank 24d. The smaller rollers 61d may have a reduced diameter as compared to the roller 60d so as to fit between the roller 60d and the edge of the shank 24d. Accordingly, the shank 24d may be arranged to reduce friction due to contact of the shank 24d with the receiver 32 as the shank 24d moves in both an up and down direction, as well as a side to side direction with respect to the receiver 32.

As shown in FIGS. 14a-14c, another embodiment shank 24e is depicted in which a roller 60e may be oriented in an upright direction similar to the shank 24c of FIGS. 12a-12c. However, one or more smaller rollers 61e may be provided on the sides of the roller 60e to reduce friction for side to side motion of the shank 24e. Accordingly, it will be understood that a variety of different arrangements of rollers 60e and smaller rollers 61e may be provided to reduce friction on the shank 24e.

Similarly, as shown in FIGS. 15a-15c, a shank 24f may be provided with a plurality of rollers 60f. The rollers 6 of may be provided at different locations along the length of the shank 24f, as well as at different locations on the width of the shank 24f. For example, the rollers 60f may be positioned on opposite sides of an end of the shank 24f, as well as in a central portion of the shank 24f.

Figure 16B:
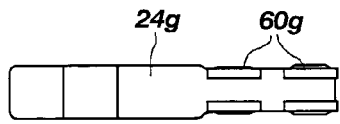
Figure 17B:
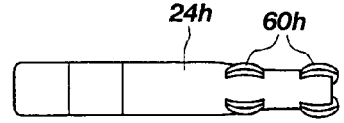
Figure 16A:
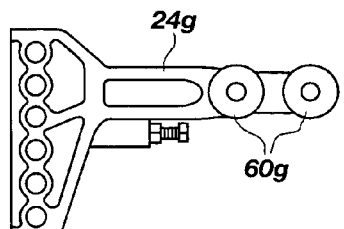
FIG. 16a is a side view of an additional embodiment of a shank used with the hitch system of the present disclosure.
Figure 16C:
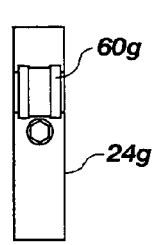
Figure 17A:
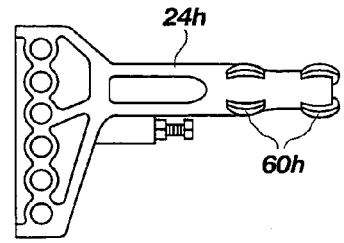
FIG. 17a is a side view of an additional embodiment of a shank used with the hitch system of the present disclosure.
Figure 17C:
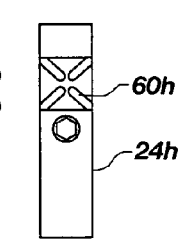

Also, as shown in FIGS. 16a-16c, rollers 60g may be provided in pairs along the length of the shank 24g. It will be understood that the rollers 60g may be provided on opposite sides of the shank 24 in two or any other suitable number of pairs along the length of the shank 24g. Moreover, it will be understood, as shown in FIGS. 17a-17c, that rollers 60h may be oriented in diagonal directions with respect to a shank 24h. The rollers 60h may be provided in sets of four at the corners of the shank 24h at any number of locations along the length of the shank 24h.

It will also be understood that in addition to the arrangements disclosed above, the rollers 60 may be arranged in any other suitable configuration, including various combinations of the configurations described above. Moreover, the rollers 60 may be arranged in other configurations on the shank 24 within the scope of the present disclosure to reduce friction as the shank 24 contacts the receiver 32.

Figure 18B:
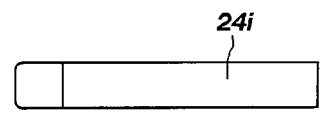
Figure 19B:
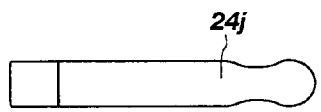
Figure 18A:
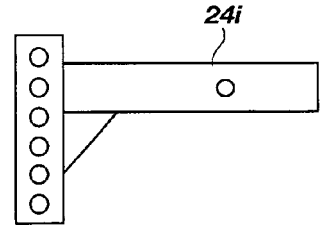
FIG. 18a is a side view of an additional embodiment of a shank.
Figure 18C:
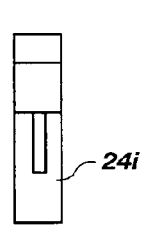
Figure 19A:
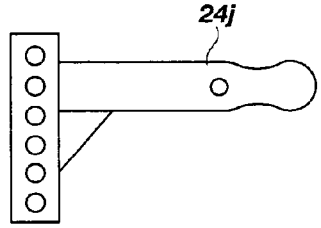
FIG. 19a is a side view of an additional embodiment of a shank.
Figure 19C:
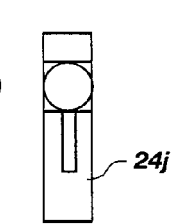

As shown in FIGS. 18a-18c, it will also be appreciated that an embodiment of the shank 24i may be provided without a stop, and having alternative shapes. For example, the shank 24i may have a square configuration. The shank 24i may or may not include any rollers 60. Similarly, as shown in FIGS. 19a-19c, a shank 24j may be provided without a stop with a rounded configuration at an end portion of the shank 24j. Accordingly, certain aspects of the present disclosure may include shanks of various different configurations.

Figure 20A:
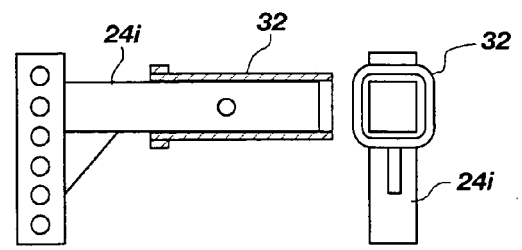
FIG. 20a is a side view of the shank of FIG. 18a in a cross section of a receiver.
Figure 20B:
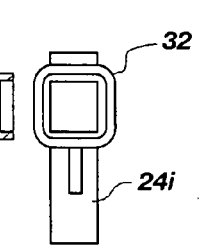
Figure 21A:
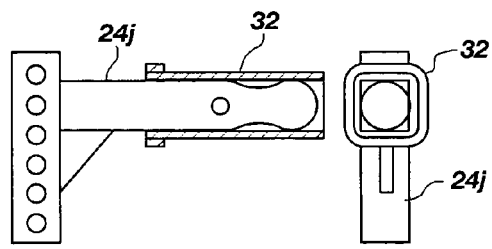
FIG. 21a is a side view of the shank of FIG. 19a in a cross section of a receiver.
Figure 21B:
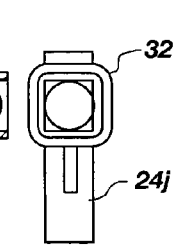

Referring now to FIGS. 20a-25c, a feature involving the contact between the shank 24 and the receiver 32 will now be described. Referring to FIG. 20a, which depicts a side view of the shank 24i in a cross-section of a receiver 32, the shank 24i may be received in the receiver 32 without significant space for excessive movement of the shank 24i within the receiver 32. An end view of the shank 24i in the receiver 32 is shown in FIG. 20b. Similarly, a side view of the shank 24j is shown in a cross-section of the receiver 32 in FIG. 21a, whereas an end view of the shank 24j is shown in FIG. 21b. Also a side view of the shank 24b is shown in a cross section of a receiver 32 in FIG. 22a, whereas an end view of the shank 24b and receiver 32 is shown in FIG. 22b.

An enlarged break-away view of the shank 24i in a cross-section of the receiver 32 is shown in FIG. 23a. A further enlarged view of the circled portion in FIG. 23a is shown in FIG. 23b. The shank 24i may have an end portion 64i that may contact the receiver 32 as the shank 24i is being inserted and withdrawn from the receiver 32. A depiction of the contact area 66i between the shank 24i and the receiver 32 at the end portion 64i is depicted in FIG. 23c. It will be understood that the contact area 66i may form a small linear area extending across the width of the receiver 32 when the shank 24i has a square cross-sectional shape. Similarly, FIGS. 24a-24c depict the shank 24j in the receiver 32 in which an end portion 64j forms a contact area 66j with the receiver 32. The rounded shape of the shank 24j may create a contact area 66j in the form of a point, as shown in FIG. 24c. In contrast, FIGS. 25a-25c depict the shank 24b in the receiver 32, in which an end portion 64b forms a contact area 66b with the receiver 32. It will be understood that the shank 24b may include the end portion 64b forming a flat surface that may provide an increased contact area 66b in the form of a rectangle. The increased contact area 66b of the shank 24b with the receiver 32 may result in a much larger and effective bearing surface for reduced friction and increase load support. It will be understood that the contact area 66b as depicted in FIG. 25c, may include a rectangular area with a long dimension of the rectangle corresponding to the width of the receiver 32, and the short dimension of the rectangle corresponding to the dimension of the contact between the shank 24b and the receiver 32 as depicted in FIG. 25b.

Referring to FIGS. 26a-27b, another feature of the present disclosure will now be discussed. FIG. 26a is a break-away side view of the shank 24j as it is being introduced in a cross-section of the receiver 32. An enlarged view of the circled portion of FIG. 26a is shown in FIG. 26b. The receiver may have an edge 68 that may contact the shank 24j as the shank 24j enters the receiver 32. The shank 24j may be formed with a waist 70j having a reduced dimension as compared to other parts of the shank 24j. The waist 70j may be formed with a gradual slope or taper to avoid abrupt edges to catch on the edge 68 of the receiver 32.

Figure 29:
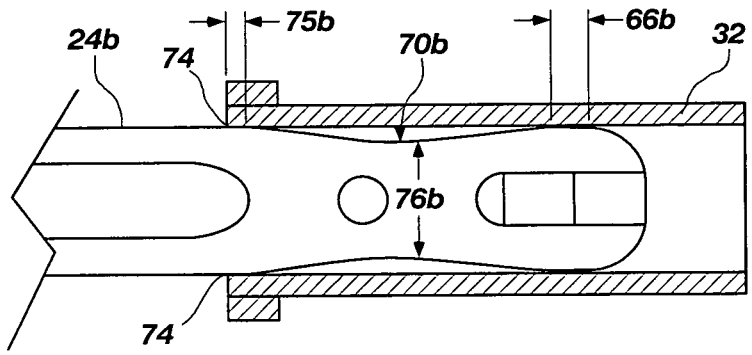

The embodiment of the shank 24b, as depicted in FIGS. 27a and 27b may have a waist 70b with yet a more gentle slope, as depicted in the enlarged circular portion in FIG. 27b. The gentle slope of the waist 70b may reduce the friction between the edge 68 of the receiver 32 and the shank 24b to facilitate introducing the shank 24b into the receiver 32. Moreover, the configuration of the shank 24b may be useful in reducing damage and wear caused by contact with the receiver 32. It will be understood that one embodiment of the shank 24b may have a waist 70b in which a length of the waist 70b comprises a majority of a length of the portion of the shank 24b that is received in the receiver 32 when the shank 24b is attached to the receiver 32, as shown in FIG. 29. For example, the length of the waist may be greater than 60% of the length of the portion of the shank 24b that is received in the receiver 32.

Figure 28:
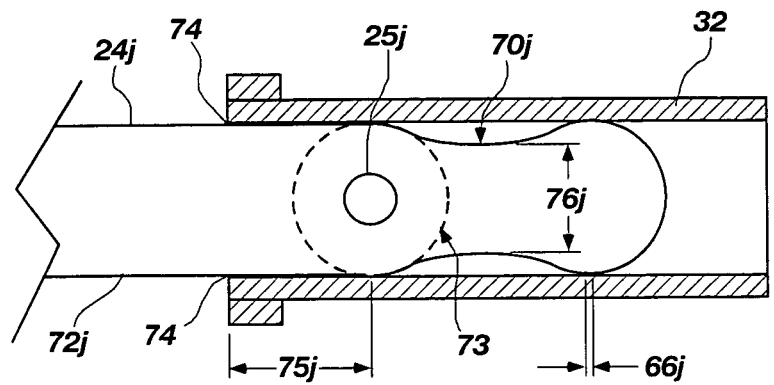

Referring to FIG. 28, an enlarged break-away view of the shank 24j and receiver 32 of FIG. 24a is shown. It will be appreciated that the waist 70j may be formed having a radius, and the shank body 72j may be square in cross-sectional shape. The radius of the waist 70j may be limited by a radius about the opening 25j in the shank 24j, and a minimum dimension 76j of the shank as dictated by required strength of the shank 24j. For example, one embodiment of the shank 24j may have a two inch radius 73 about the opening 25j, and a minimum dimension 76j of approximately one and a half inches, which may limit the radius of the waist 70j. The shank body 72j may contact the receiver 32 from an edge 74 of the receiver 32 to where the waist 70j begins, as indicated by the dimension at reference numeral 75j. Moreover, the contact area 66j may also be minimal due to the waist 70j and the shape of the shank 24j near its end.

In contrast, with reference to FIG. 29, the shank 24b may include a waist 70b with a larger radius to form a gentler curve. Accordingly, the contact surface 75b near the edge 74 of the receiver 32 may be smaller, such as approximately one half inch in length, for example. However, the contact area 66b may be somewhat larger than the previously discussed embodiment. For example, one embodiment of the contact area 66b may be within a range of 0.5 to 1.0 inches in length. More specifically, one embodiment of the contact area 66b may be approximately 0.75 inches in length to provide adequate strength and support for the shank 24. One embodiment of the shank 24 may include the contact area 66 on all sides of the shank to maximize bearing area. Corners of the shank 24 may be radiused, for example, a minimum amount required to clear the inside of the receivers 32, plus one thirty second to one quarter of an inch to allow for production variances. It will be understood that the shank 24 and waist 70 may be formed of any suitable radius, linear slope, or other shape, within the scope of the present disclosure.

Figure 30:
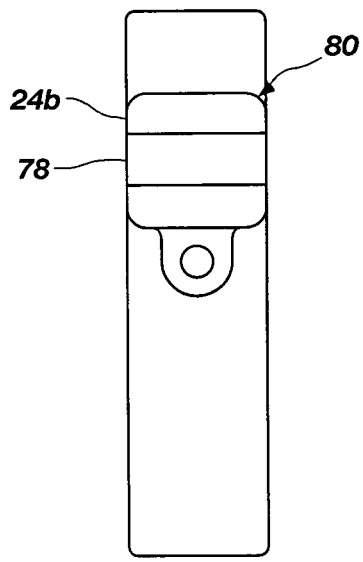
FIG. 30 is an enlarged end view of the shank of FIG. 11c.

Referring to FIG. 30, an end view of the shank 24b is shown. It will be understood that sides 78 of the shank 24b may be substantially flat to provide a bearing surface with the receiver 32. Corners 80 of the shank 24b may be radiused to facilitate introducing the shank 24b into the receiver 32.

Figures 31A, 31B, 31C:
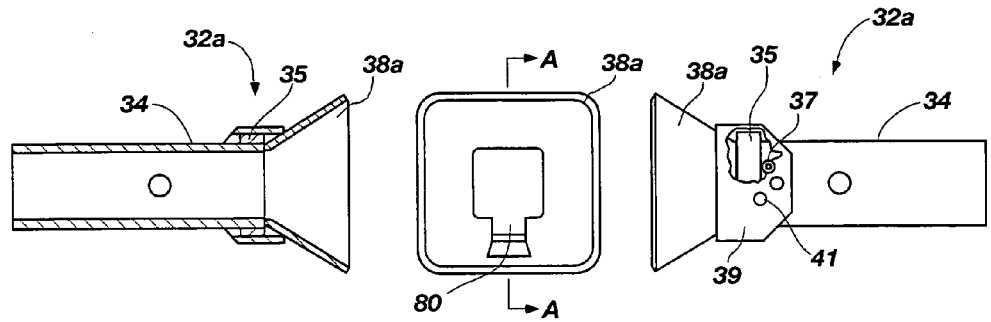

Referring now to FIGS. 31a-31c, one embodiment of a receiver 32a and guide 38a is shown. FIG. 31a shows an end view of the guide 38a where the shank 24 may be introduced, whereas FIG. 31b shows a cross-sectional view of the receiver 32 and guide 38a taken along line A-A, and FIG. 31c shows a side view of the receiver 32a with a partially broken away portion of the guide 38a.

The guide 38a may include an attachment portion 39 for attaching to the receptacle 34. The attachment portion 39 may include a plurality of attachment portion openings 41. It will be understood that the receptacle 34 may include a collar 35, and the guide 38a may be attached to the receptacle 34 using a fastener 37 positioned into or behind the collar 35 through one of the attachment portion openings 41. It will be appreciated that the fastener may include a screw, bolt, pin, clip, plate, or the like, or any other suitable mechanism for joining components. It will also be understood that the attachment portion openings 41 may be positioned at different distances from an end of the guide 38a in a lateral direction extending from the tow vehicle 12 to the trailer 14. The position of the attachment portion openings 41 may be configured to allow for different sized collars 35 to be used and still allow the guide 38a to be attached to the receptacle 34 with a tight fit. A user may thus select the appropriate attachment portion openings 41 for receiving the fastener 37 to provide the desired fit of the guide 38a on the receptacle 34 such that the guide 38a may be versatile for use with various different sized collars 35. It will also be understood that the attachment portion openings 41 may be arranged in any suitable configuration, and that some embodiments of the guide 38a may have a single attachment portion opening 41. Moreover, other embodiments of the receiver 32a may be formed without a collar 35.

As shown most clearly in FIG. 31b, the guide 38a may have a flared opening to facilitate introducing the shank 24 into the receptacle 34. It will be appreciated that the guide 38a may have any suitable size and configuration to facilitate guiding the shank 24 to the receptacle 34.

One embodiment of the guide 38*a* may include a slot 80 for receiving the stop 44 such that the stop 44 contacts the receptacle 34 for limiting movement of the shank 24 against the receptacle 34. It will be understood that the size and configuration of the slot 80 may vary within the scope of the present disclosure.

Figures 32A, 32B, 32C:
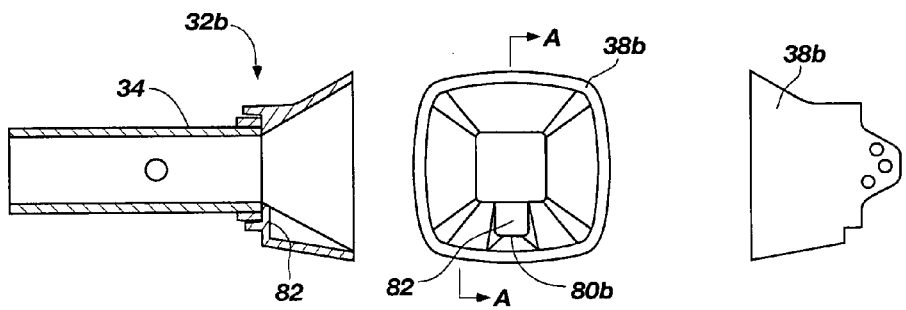

Referring to FIGS. 32*a*-32*c*, an alternative embodiment receiver 32*b* is shown. The receiver 32*b* may have a guide 38*b* that may be formed similar to the guide 38*a* discussed above, except the guide 38*b* may include an abutment 82 in the slot 80*b* for contacting the stop 44. Accordingly, the stop 44 may not contact the receptacle 34 directly. The guide 38*b* may be formed using any suitable method, such as casting or the like, within the scope of the present disclosure.

Figures 33A, 33B, 34A, 34B:
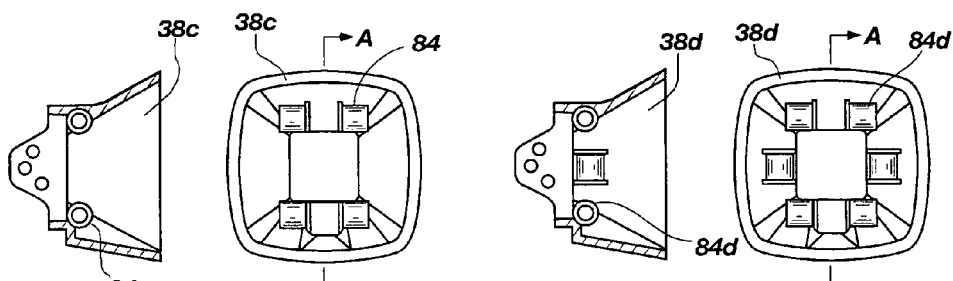
Figure 35:
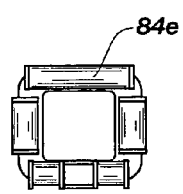
FIG. 35 is an end view of a friction reduction member useful with a guide of the present disclosure.
Figure 40:
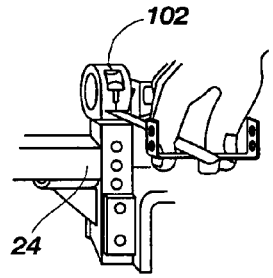
FIG. 40 is a break-away perspective view of a visual guidance system useful with the trailer hitch system of the present disclosure.
Figure 41:
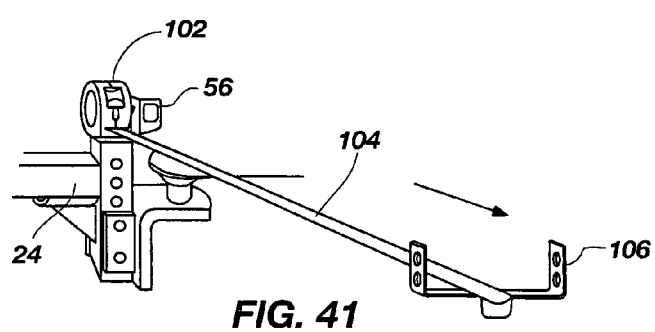
FIG. 41 is a view of the visual guidance system of FIG. 40 in an extended position.
Figure 42:
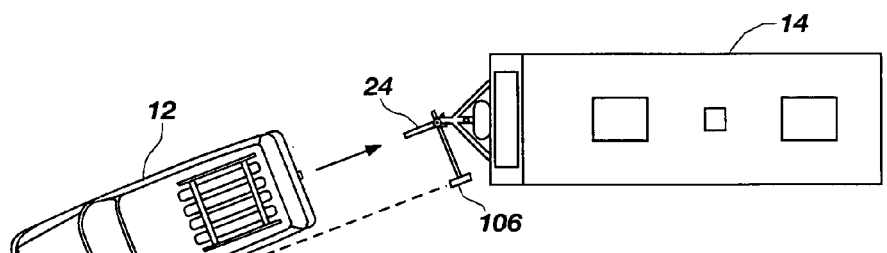
FIG. 42 is a top view of a trailer and tow vehicle using the visual guidance system of FIG. 40 to assist in backing the tow vehicle to the trailer.

Another embodiment guide 38*c* is disclosed in FIGS. 33*a* and 33*b*. The guide 38*c* may be similar to the previously disclosed embodiments, except the guide 38*c* may include one or more guide rollers 84. The guide rollers 84 may be configured to contact the shank 24 and to rotate, to thereby reduce friction between the shank 24 and the guide 38*c*. One embodiment of the present disclosure may include guide rollers 84 located on a portion of an upper and lower wall of the guide 38*c*. However, as depicted in FIGS. 34*a* and 34*b*, it will be understood that guide rollers 84*d* may be positioned on side walls of the guide 38*d*. Moreover, as shown in FIG. 35, guide rollers 84*e* may be provided having different sizes and arrangements. It will be understood that guide rollers of any quantity, size, configuration, and arrangement are to be included within the scope of the present disclosure.

Referring now to FIGS. 1 and 36-39, another feature of the hitch system 10 is disclosed for allowing the shank 24 to be positioned at a proper height for connecting the shank 24 to the receiver 32. Thus, it will be understood that the principles of the present disclosure may be used to assure that the height of the vehicle receiver 32 and the trailer shank 24 is matched, as any misalignment may place the weight of the vehicle 12 and trailer 14 tongue on part of the hitch system 10.

A gauge 86 having measurement indicia may be positioned on the upper stationary portion of the trailer tongue jack 88. An indicator 90 may be attached to the lower portion of the trailer tongue jack 88. It will be understood that in one embodiment, the lower portion of the trailer tongue jack 88 may move in a telescoping manner with respect to the upper portion of the trailer tongue jack 88 as the jack 88 is raised and lowered. The indicator 90 may be attached in any manner known in the art so as to remain non-movable with respect to the lower portion of the jack 88, and movable with respect to the upper portion of the jack 88. It will also be understood that alternative embodiments may be used in which the indicator 90 is non-movably fixed with respect to the upper portion of the jack 88 and movable with respect to the lower portion of the jack 88. Also, alternative embodiments of the jack 88 may be used in which different portions of the jack 88 move with respect to other portions of the jack 88.

A pointer 92 may be joined to or formed as part of the indicator 90 such that the pointer 90 can be viewed with respect to the gauge 86. A marker 94, such as a magnetic strip or sliding gauge, may also be attached to the upper portion of the trailer tongue jack 88. It will be understood that the marker 94 may be formed in any manner and may be removably attachable to the gauge 88 in any manner known in the art, such as magnets, adhesives, straps, fasteners, and the like. Moreover, alternative embodiments of the hitch system 10 may not include a marker 94.

The marker 94 may include an arrow 96 corresponding to the location of the pointer 92 at the height of the trailer 14 where the shank 24 aligns with the receiver 32 when no load is placed on the tow vehicle 12. This is the position of the shank 24 for mating with the receiver 32 when the tow vehicle 12 backs into the shank 24. The marker 94 may also include an arrow 97 corresponding to the point where the trailer jack foot 98 contacts the ground when lifting the trailer 14, such that the trailer 14 may be lowered a distance from arrow 96 to arrow 97 to load the trailer 14 on the tow vehicle 12. Accordingly, it will be understood that the trailer 14 may be moved up and down for leveling, and returned to a specified position for attaching to the tow vehicle 12. Readjustment of the marker 94 may not be required if the trailer 14 is used on relatively level surfaces and the loads on the trailer 14 and tow vehicle 12 remain substantially constant.

To attach the tow vehicle 12 to the trailer 14, it will be understood that the trailer 14 may be jacked up to the point where the pointer 92 aligns with the arrow 96. Then the tow vehicle 12 may back into the trailer 14 such that the shank 24 is received in the receiver 32. Then the trailer 14 may be lowered such that the load from the trailer 14 is supported by the tow vehicle 12. The point where the foot 98 of the trailer jack 88 is still in contact with the ground and the entire load of the trailer 14 is carried by the tow vehicle 12 may correspond to where the pointer 92 aligns with arrow 97. It will be understood that some embodiments of the gauge 82 may be formed without indicia, and that various different indicia, including letters, numbers, symbols, diagrams, and the like may be used.

Referring now to FIGS. 40-45 another feature of the hitch system 10 is disclosed. An alignment guide 102 may be attached to the shank 24. One embodiment of the alignment guide 102 may be configured to easily and quickly clip or otherwise attach to the bracket 56 in any suitable manner known to those skilled in the art. The alignment guide 102 may be light and compact, and may include a support 104 that may be retractable, formed similar to a retractable tape measure as is known in the art. Thus, the support 104 may be flexible to be rolled together, yet sufficiently rigid to maintain its position as it is extended. Accordingly, the support 104 of the alignment guide 102 can be extended to a desired position to be visible to facilitate backing the tow vehicle 12 toward the trailer 14. Also, the support 104 of the alignment guide 102 may be retracted such that the support 104 may be rolled to a compact configuration for being transported or stored. A spring mechanism may be provided to quickly and easily retract the support 104, and a holding or locking mechanism may be provided in any manner known in the art to maintain the support 104 in an extended position.

A pair of arms 106 may extend from an end of the support 104. The arms 106 may be formed as spaced apart members that may be aligned to indicate proper alignment while backing the tow vehicle 12. An optional attachment marker 108 may also be placed on the tow vehicle 12 to facilitate determining when the tow vehicle 12 is properly aligned with the trailer 14. The attachment marker 108 may be attachable to the tow vehicle 12 using magnets, adhesives, fasteners or the like so as to align with the arms 106 when the trailer 14 and tow vehicle 12 are in proper alignment. One embodiment of the attachment marker 108 may be attached to a side view mirror 110 of the tow vehicle 12.

Figure 43:
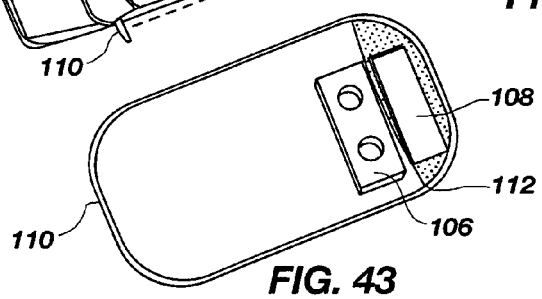
FIG. 43 is a view of a side mirror on the tow vehicle of FIG. 42 showing the visual guidance system in alignment.
Figure 44:
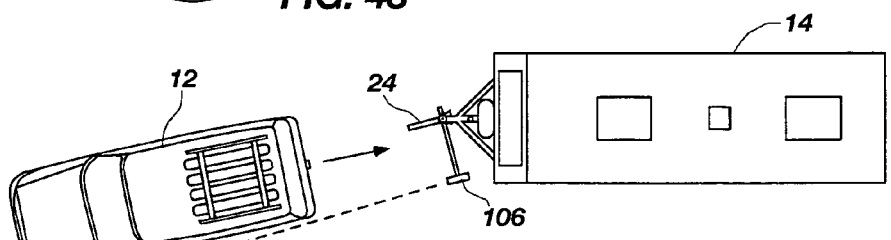
FIG. 44 is a top view of the trailer and tow vehicle of FIG. 42 with the tow vehicle and trailer out of alignment.
Figure 45:
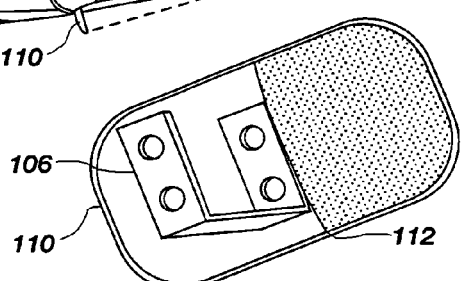
FIG. 45 is a view of a side mirror on the tow vehicle of FIG. 44 showing the visual guidance system out of alignment.

In use, the arms 106 may be extended to the point where they are just visible at the very edge of the side of the tow vehicle 12 when viewed through the side view mirror 110. It will be understood that FIG. 43 depicts the driver's view through the side view mirror 110 if proper alignment is achieved with the side of the vehicle 12 and/or attachment marker 108 and the two arms 106 of the alignment guide 102. FIG. 45 depicts the driver's view through the side view mirror 110 if the tow vehicle 12 is not properly aligned with the shank 24 for attaching the tow vehicle 12 to the trailer 14. Since the arms 106 may be attached to shank 24 at a right angle, alignment of the arms 106 may assure the correct approach alignment. If both arms 106 are kept at the edge 112 of the vehicle 12 as seen in the side view mirror 110 and the arms 106 do not either disappear from view or move outside the edge 112 of the vehicle 12, the receiver 32 and trailer hitch shank 24 will be centered for engagement. The optional attachment marker 108 can be used initially to get accustomed to the three point system, but drivers may quickly learn to use the side edge 112 of the vehicle 12 for reference and may not require the attachment markers 108 for either straight or angled hook-ups. If the three points, defined by the two arms 106 and the edge 112 of the vehicle 12, or the attachment marker 108, are visually kept in line as shown in FIG. 43, proper alignment, centering and engagement of the shank 24 and receiver 32 may be facilitated. However, if the two arms 106 are not kept in line at the edge 112 of the vehicle 12, as viewed through the side view mirror 110 in FIG. 45, neither proper alignment or centering may be achieved.

In one embodiment of the present disclosure, the arms 106 may also be observed to move or quiver when the tow vehicle 12 contacts the trailer 14 or hitch system 10 to further communicate attachment status of the hitch system 10. If by error the driver misses alignment of the shank 24 in the guide 38, and contact is made between the tow vehicle 12 and the shank 24 or trailer 14, the arms 106 on the end of the support 104 may jump suddenly indicating improper contact. If the operator exhibits reasonable care in backing up, the potential for damage is greatly reduced using the principals of the present disclosure as compared to contact with the sharp end of a trailer hitch as is common in conventional ball hook-up situations.

In cases where the tow vehicle 12 can approach the trailer 14 straight, fairly skilled and experienced drivers can simply center the tow vehicle 12. If the vehicle 12 is kept straight, a successful coupling of the shank 24 and vehicle receiver 32 can be accomplished without requiring the driver to get out of the tow vehicle 12. Moreover, one aspect of the present disclosure may be unique in that only alignment with the vehicle 12 and the shank 24 may be required such that there may be no requirement for front to back positioning as is customary in ball hitch attachment processes. The adjustable stop 44 on the shank 24 may eliminate positioning problems in the front to back direction as the stop 44 may allow the receiver opening 40 to match with the shank opening 25 when the stop 44 contacts the receiver 32. Thus the principles of the present disclosure may be used to make attaching the tow vehicle 12 to the trailer 14 faster, easier and safer.

It will be understood that the three point alignment system disclosed herein can also be employed by using the center rear view mirror of the vehicle 12. It will also be appreciated that other similar visual, optical, mechanical and electronic variations on the three point method are within the scope of the present disclosure. Moreover, if the tow vehicle 12 can approach the trailer 14 straight, drivers can also engage the hitch system 10 by simply centering two markers or points on the trailer 14 when viewed through both vehicle's side rear view mirrors. Accordingly, it will be understood that the visual guidance system may not be present in some embodiments of the present disclosure.

It will be understood that the components of the present disclosure may be manufactured using processes known to those skilled in the art. Moreover, the materials used to manufacture the components of the hitch system 10 may vary in accordance with suitable materials known in the art.

It will be appreciated that the structure and apparatus disclosed herein is merely one example of a means for facilitating insertion of a shank into a receiver, and it should be appreciated that any structure, apparatus or system for facilitating insertion of a shank into a receiver that performs functions the same as, or equivalent to, those disclosed herein are intended to fall within the scope of a means for facilitating insertion of a shank into a receiver, including those structures, apparatus or systems for facilitating insertion of a shank into a receiver that are presently known, or that may become available in the future. Anything that functions the same as, or equivalently to, a means for facilitating insertion of a shank into a receiver falls within the scope of this element.

It will be appreciated that the structure and apparatus disclosed herein is merely one example of a means for adjusting the height of a shank with respect to a ball mount, and it should be appreciated that any structure, apparatus or system for adjusting the height of a shank with respect to a ball mount that performs functions the same as, or equivalent to, those disclosed herein are intended to fall within the scope of a means for adjusting the height of a shank with respect to a ball mount, including those structures, apparatus or systems for adjusting the height of a shank that are presently known, or that may become available in the future. Anything that functions the same as, or equivalently to, a means for adjusting the height of a shank with respect to a ball mount falls within the scope of this element.

In accordance with the features and combinations described above, a useful method of attaching a trailer to a tow vehicle includes:
    joining a shank to a trailer tongue;
    joining a receiver to the tow vehicle;
    backing the tow vehicle towards the trailer to introduce the shank into the receiver;
    preventing movement of the shank into the receiver beyond a stop position; and
    adjusting the stop position to a predetermined position for attaching the shank to the receiver.

Those having ordinary skill in the relevant art will appreciate the advantages provided by the features of the present disclosure. For example, it is a feature of the present disclosure to provide a trailer hitch system that is simple in design and manufacture. Another feature of the present disclosure is to provide such a trailer hitch system that makes attaching the tow vehicle to the trailer faster, easier and safer, especially in situations where assistance from another individual is not available. It is a further feature of the present disclosure, in accordance with one aspect thereof, to provide a trailer hitch system that has improved vertical and backing alignment mechanisms. It is another feature of the present disclosure to provide a hitch system that may be used with or incorporate a conventional hitch receiver. It is another feature of the present disclosure, in accordance with one aspect thereof, to provide an improved hitch shank with friction reducing bearing surfaces, and a roller element or elements to reduce the possibility of binding or sticking with the receiver, and a specifically contoured shape to accommodate misalignment and further reduce friction between the shank and the receiver. It is an additional feature of the present disclosure to provide an adjustable stop to facilitate aligning openings in the shank and the receiver to make installation of a hitch coupler or pin easier. It is another feature of the present disclosure to provide a trailer hitch system that may include weight distributing and sway control features that may remain on the trailer, saving significant time and effort in attaching the trailer to a tow vehicle, and providing advantages for those without physical strength required to perform the customary attachment steps. For example, the features of the present disclosure may eliminate the need to tension and release spring bars. It is an additional feature of the present disclosure to provide a hitch system which may remain primarily with the trailer to prevent the hitch from protruding from the back of the tow vehicle to thereby reduce interference with the back of the tow vehicle and associated hazards. It is another feature of the present disclosure to provide a hitch system that can be used on both weight carrying and weight distribution type hitch applications. The present disclosure may be a complete stand alone hitch assembly for either weight carrying or weight distribution applications, or selected components can serve to upgrade most conventional weight distribution hitches to such a plug-in system. The present disclosure may thus eliminate the requirement for millions of consumers with existing trailer hitches to buy a complete new hitch, which may greatly broaden the market appeal of the principles of the present disclosure.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A trailer hitch system for attaching a trailer to a tow vehicle, said trailer hitch system comprising:
   a shank attachable to said trailer, said shank having an upright portion and a lateral portion for being received in a receiver attachable to said tow vehicle;
   a stop for contacting said receiver for limiting a depth said shank extends within said receiver, wherein said stop is disposed to and extends away from said upright portion of said shank, and wherein said stop is disposed in a fixed position to said lateral portion of said shank and extends in a direction toward the receiver when said lateral portion of the shank extends toward the receiver, wherein said stop comprises a bore, a head and a shaft extending from the head, wherein said shaft is mounted in the bore and is narrow in width than the head; and
   a locking member installed on the shaft of the stop.

2. A trailer hitch system for attaching a trailer to a tow vehicle, said trailer hitch system comprising:
   a shank attachable to said trailer, said shank having an upright portion and a lateral portion for being received in a receiver attachable to said tow vehicle;
   a stop for contacting said receiver for limiting a depth said shank extends within said receiver, wherein said stop is disposed to and extends away from said upright portion of said shank and wherein said stop is disposed in a fixed position to said lateral portion of said shank and extends in a direction toward the receiver when said lateral portion of the shank extends toward the receiver, wherein said stop comprises a threaded bore, a head and a threaded shaft extending from the head, wherein said threaded shaft is mounted in the threaded bore; and
   a locking nut installed on the threaded shaft of the stop.

3. The trailer hitch system of claim 2, further comprising a ball mount for receiving a hitch ball for attaching to a trailer tongue.

4. The trailer hitch system of claim 2, wherein said system comprises said receiver, wherein said receiver comprises a wall for circumscribing said shank for coupling said trailer to said tow vehicle.

5. The trailer hitch system of claim 2, wherein the stop terminates in a planar contacting face.

6. The trailer hitch system of claim 2, wherein the stop extends substantially parallel to the lateral extending portion of the shank.

7. The trailer hitch system of claim 2, wherein the stop and the lateral extending portion of the shank are both elongate.

8. The system of claim 2, wherein the shank includes the stop such that the stop is a part of the shank, and is attached to and extends laterally away from the upright portion of the shank.

9. A trailer hitch system for attaching a trailer to a tow vehicle, said trailer hitch system comprising:
   a shank attachable to said trailer and attachable to said Tow vehicle through a receiver, said shank having an upright portion and a lateral portion;
   a stop for contacting said receiver for limiting a depth said shank extends within said receiver, wherein said stop is disposed to and extends away from said upright portion of said shank, and wherein said stop is disposed in a fixed position to said lateral portion of said shank, wherein said stop comprises a threaded bore, a head and a threaded shaft extending from the head, wherein said threaded shaft is mounted in the threaded bore; and
   a locking nut installed on the threaded shaft of the stop.

10. A trailer hitch system for attaching a trailer to a tow vehicle, said trailer hitch system comprising:
    a shank attachable to said trailer, said shank having an upright portion and a lateral portion, wherein said lateral portion is extendable within a receiver attached to said tow vehicle for attaching said shank to said tow vehicle;
    a stop having an un-adjustable fixed portion disposed to and extends away from said upright portion of said shank, and wherein said fixed portion of said stop is further disposed in a fixed position to said lateral portion of said shank for contacting said receiver for limiting a depth said shank extends within said receiver;
    wherein said stop further includes an adjustable portion adjustably connected to the un-adjustable fixed portion and is adjustable in a plurality of fixed positions with respect to said shank for varying said depth said shank extends within said receiver, wherein said stop comprises a threaded bore, a head and a threaded shaft extending from the head, wherein said threaded shaft is mounted in the threaded bore; and
    a locking nut installed on the threaded shaft of the stop.

* * * * *